US007542059B2

(12) United States Patent
Rizzolo et al.

(10) Patent No.: US 7,542,059 B2
(45) Date of Patent: Jun. 2, 2009

(54) PAGE SCHEDULING FOR PRINTING ARCHITECTURES

(75) Inventors: Charles D. Rizzolo, Fairport, NY (US); Edul N. Dalal, Webster, NY (US); Dusan G. Lysy, Fairport, NY (US); Dale R. Mashtare, Bloomfield, NY (US); R. Victor Klassen, Webster, NY (US); Wencheng Wu, Webster, NY (US); Nancy B. Goodman, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 449 days.

(21) Appl. No.: 11/378,046

(22) Filed: Mar. 17, 2006

(65) Prior Publication Data

US 2007/0216746 A1 Sep. 20, 2007

(51) Int. Cl.

*G03G 15/01* (2006.01)
*B41J 29/38* (2006.01)
*G03B 27/00* (2006.01)
*G06F 3/12* (2006.01)

(52) U.S. Cl. ............................ 347/117; 347/5; 347/16; 355/202; 358/1.13; 358/1.15

(58) Field of Classification Search .................... 347/5, 347/16, 19, 104, 105; 399/27; 358/1.13, 358/1.15

See application file for complete search history.

(56) References Cited

U.S. PATENT DOCUMENTS 4,579,446 A 4/1986 Fujino et al.
4,587,532 A 5/1986 Asano
4,836,119 A 6/1989 Siraco et al.
5,004,222 A 4/1991 Dobashi
5,080,340 A 1/1992 Hacknauer et al.
5,095,342 A 3/1992 Farrell et al.
5,159,395 A 10/1992 Farrell et al.
5,208,640 A 5/1993 Horie et al.
5,272,511 A 12/1993 Conrad et al.
5,326,093 A 7/1994 Sollitt
5,435,544 A 7/1995 Mandel
5,473,419 A 12/1995 Russel et al.
5,489,969 A 2/1996 Soler et al.
5,504,568 A 4/1996 Saraswat et al.
5,525,031 A 6/1996 Fox
5,557,367 A 9/1996 Yang et al.
5,568,246 A 10/1996 Keller et al.

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Stephen D Meier
*Assistant Examiner*—Kar Yip
(74) *Attorney, Agent, or Firm*—Fay Sharpe LLP

(57) ABSTRACT

At least sequential current and subsequent sheets of a print job are received in a document processing system. Each sheet includes a front image and a back image. The received sheets are scheduled to be printed with at least one of a first and a second sequence by at least one of a first and a second marking engine based on a comparison of the image content in corresponding selected portions of each front and back image.

12 Claims, 7 Drawing Sheets

U.S. PATENT DOCUMENTS

| | | | |
|---|---|---|---|
| 5,570,172 | A | 10/1996 | Acquaviva |
| 5,596,416 | A | 1/1997 | Barry et al. |
| 5,629,762 | A | 5/1997 | Mahoney et al. |
| 5,710,968 | A | 1/1998 | Clark et al. |
| 5,778,377 | A | 7/1998 | Marlin et al. |
| 5,884,910 | A | 3/1999 | Mandel |
| 5,995,721 | A | 11/1999 | Rourke et al. |
| 6,059,284 | A | 5/2000 | Wolf et al. |
| 6,097,500 | A | 8/2000 | Fromherz |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,606,165 | B1 * | 8/2003 | Barry et al. .................. 358/1.9 |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,618,167 | B1 | 9/2003 | Shah |
| 6,621,576 | B2 | 9/2003 | Tandon et al. |
| 6,631,007 | B1 * | 10/2003 | Buis et al. .................. 358/1.13 |
| 6,633,382 | B2 | 10/2003 | Hubble, III et al. |
| 6,639,669 | B2 | 10/2003 | Hubble, III et al. |
| 6,814,004 | B2 | 11/2004 | Lofthus et al. |
| 6,819,906 | B1 | 11/2004 | Herrmann et al. |
| 6,966,712 | B2 * | 11/2005 | Trelewicz et al. ............. 400/76 |
| 6,973,286 | B2 | 12/2005 | Mandel et al. |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2005/0034613 | A1 | 2/2005 | Lofthus et al. |

OTHER PUBLICATIONS

Desmond Fretz, “Cluster Printing Solution Announced”, Today at Xerox (TAX), No. 1129, Aug. 3, 2001.
U.S. Appl. No. 10/785,211, filed Feb. 24, 2004, Lotfhus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,458, filed Aug. 23, 2004, Lofthus et al.
U.S. Appl. No. 10/933,556, filed Sep. 3, 2004, Spencer et al.
U.S. Appl. No. 11/069,020, filed Feb. 28, 2005, Lofthus et al.
U.S. Appl. No. 11/102,355, filed Apr. 8, 2005, Fromherz et al.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/170,845, filed Jun. 30, 2005, Sampath et al.
U.S. Appl. No. 11/235,979, filed Sep. 27, 2005, Anderson et al.
U.S. Appl. No. 11/236,099, filed Sep. 27, 2005, Anderson et al.
U.S. Appl. No. 11/287,177, filed Nov. 23, 2005, Mandel et al.
U.S. Appl. No. 11/291,860, filed Nov. 30, 2005, Willis.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/341,733, filed Jan. 27, 2006, German.

* cited by examiner

PAGE SCHEDULING FOR PRINTING ARCHITECTURES

CROSS REFERENCE TO RELATED PATENTS AND APPLICATIONS

The following patents and patent applications, the disclosures of each being totally incorporated herein by reference are mentioned:

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. application Ser. No. 11/069,020, filed Feb. 28, 2004, entitled "PRINTING SYSTEMS," by Robert M. Lofthus, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/317,167, filed Dec. 23, 2005, entitled "PRINTING SYSTEM," by Robert M. Lofthus, et al.; and U.S. application Ser. No. 11/341,733, filed Jan. 27, 2006, entitled "PRINTING SYSTEM AND BOTTLENECK OBVIATION", by Kristine A. German.

BACKGROUND

The following relates to printing systems. It finds particular application in conjunction with scheduling pages in print or marking systems with multiple printing engines for improving the image consistency of the pages within a booklet and will be described with the particular reference thereto. However, it is to be appreciated that the present exemplary embodiments are also amenable to other like applications.

Typically, in image printing systems, it is desirable that a printed image closely match, or have similar aspects or characteristics to a desired target or input image. However, many factors, such as temperature, humidity, ink or toner age, and/or component wear, tend to move the output of a printing system away from the ideal or target output. For example, in xerographic marking engines, system component tolerances and drifts, as well as environmental disturbances, may tend to move an engine response curve (ERC) away from an ideal, desired or target engine response and toward an engine response that yields images that are lighter or darker than desired.

In the printing systems, which include multiple printing engines, the importance of engine response control or stabilization is amplified. Subtle changes that may be unnoticed in the output of a single marking engine can be highlighted in the combined output of a multi-engine image marking system.

One problem arises when the facing pages of an opened booklet produced by a multi-engine printing system are printed by different engines. For instance, the left-hand page in an open booklet may be printed by a first print engine while the right-hand page is printed by a second print engine. The first print engine may be printing images in a manner slightly darker than the ideal and well within a single engine tolerance; while the second print engine may be printing images in a manner slightly lighter than the ideal and also within the single engine tolerance. While a user might not ever notice the subtle variations when reviewing the output of either engine alone, when the combined output is compiled and displayed in the open booklet on adjacent facing pages, the variation in intensity from one print engine to another may become noticeable and be perceived as an issue of quality by a user. One approach to correct this problem is to print the facing pages of the document by the same printing engine.

However, such an approach is problematic in some cases. For example, the user might be riffling through a stapled booklet each page of which, for example, includes the same colored image in the same portion of each right-hand page, e.g. a company logo. For instance, the facing pages are printed by the same engine, therefore, the right-hand pages are printed by different print engines. When the combined output is compiled and displayed adjacently page after page, the variation in the color intensity from one right-hand page to another may become noticeable and objectionable by the user.

There is a need for methods and apparatuses that overcome the aforementioned problems and others.

REFERENCES

U.S. Pat. No. 6,097,500, issued Aug. 1, 2000, entitled "OPERATION SCHEDULING SYSTEM FOR A DIGITAL PRINTING APPARATUS, WHERE NEW CONSTRAINTS CAN BE ADDED," by Fromherz, discusses a scheduling system which determines the order of specific operations in a printing apparatus which is capable of outputting simplex or duplex prints.

U.S. Pat. No. 6,618,167, issued Sep. 9, 2003, "APPARATUS AND METHOD FOR DOCUMENT SCHEDULING IN ORDER TO IMPROVE THE PRODUCTIVITY OF A NETWORKED PRINTER," by Shah, discusses a scheduling scheme that uses an estimated rasterization execution time (RET) to improve the productivity of printers, particularly color printers.

U.S. Pat. No. 6,814,004, "FACE-TO-FACE PRINTING WITHIN BOOKLET," Nov. 9, 2004, by Lofthus et al., describes a system in which two marking engines arranged in series are used to print a booklet in which facing pages are printed by the same duplex marking engine.

U.S. Patent Application Publication No. 2005/0034613 to Lofthus et al., published Feb. 17, 2005, entitled "FACE-TO-FACE PRINTING WITHIN BOOKLET," discusses method for printing pages within a booklet to improve the appearance of images on opposing pages includes sequencing images such that opposing pages are printed with the same print engine and/or fused the same number of times.

However, the above publications do not discuss printing pages in different sequence based on the image content.

BRIEF DESCRIPTION

In accordance with one aspect a method is disclosed. At least sequential current and subsequent sheets of a print job are received. Each sheet includes a front image and a back image. The received sheets are scheduled to be printed with at least one of a first and a second sequence by at least one of a first and a second marking engine, which scheduling includes selecting at least a portion of each front and back image, comparing corresponding selected portions of the front and back images, and based on the comparison, scheduling the front and back images for printing with one of the first and second sequence.

In accordance with another aspect, a printing system is disclosed. At least first and second marking engines each prints sequential sheets of a print job, each sheet including a front and a back image. A document portion selecting mechanism selects at least a portion of each front and back image. An analyzing processor analyzes corresponding selected portions. Based on the analysis, a sequence selecting mechanism selects at least one of a first and a second sequence with which the front and back images of the sequential sheets are printed.

In accordance with another aspect a method is disclosed. Sequential sheets of a print job are received, each sheet including a front and a back image. At least a portion of each front and back image is selected. Corresponding pixels of the selected portions of the received sequential sheets are compared. Substantially similar pixels in the compared selected portions of the adjacent back and front images are identified. Based on the identified similar pixels, the front and back images of the received sequential sheets are scheduled to be printed with at least one of a first and a second sequence.

DETAILED DESCRIPTION

Figure 1:
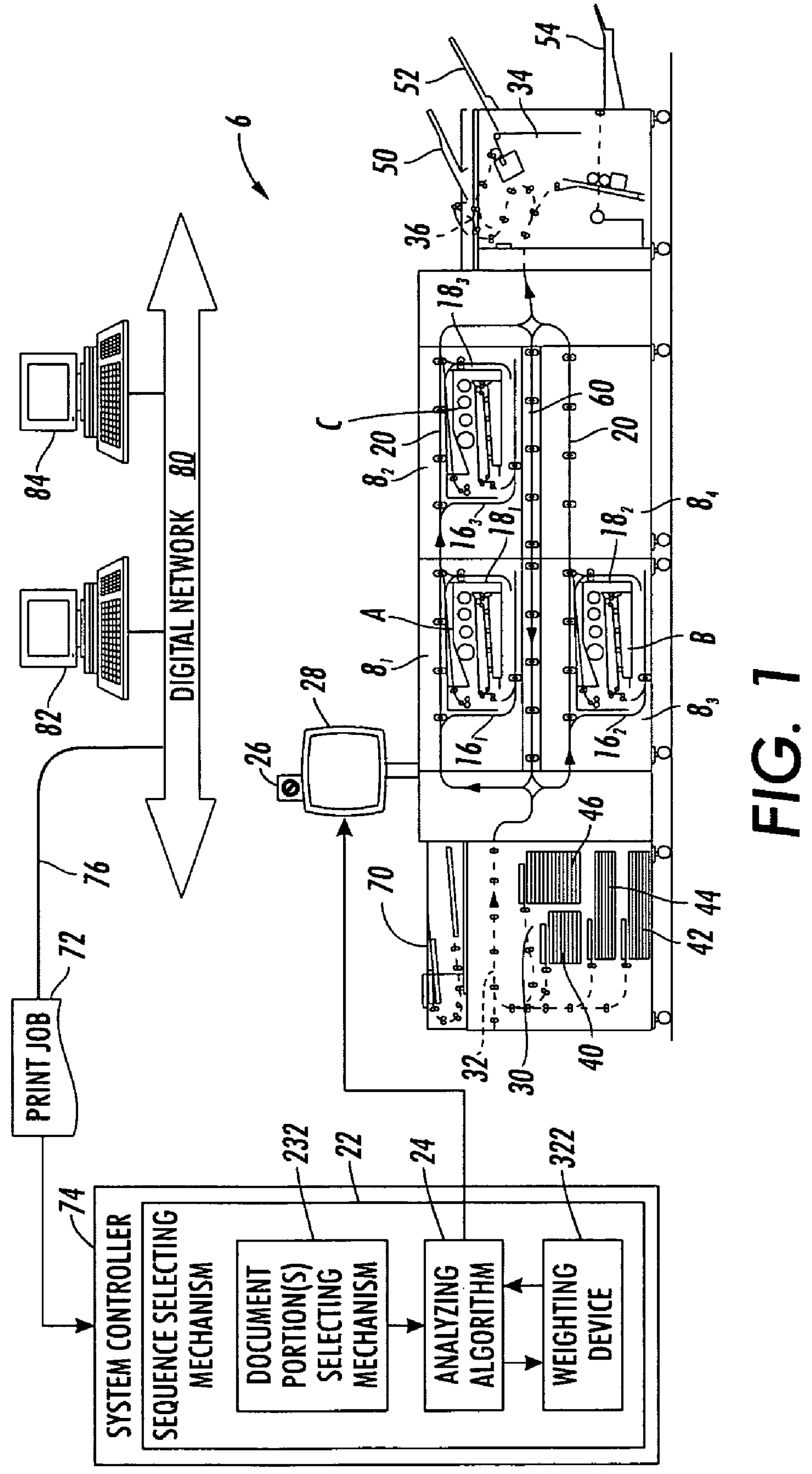
FIG. 1 is a diagrammatic illustration of a document processing system.

With reference to FIG. 1, an example printing or document processing system 6 includes first, second, . . . , nth marking engine processing units $\mathbf{8}_1$, $\mathbf{8}_2$, $\mathbf{8}_3$, . . . $\mathbf{8}_n$ each including associated first, second, . . . , nth marking or print engines or devices A, B, C, . . . , Z and associated first, second, . . . , nth entry $\mathbf{16}_1$, $\mathbf{16}_2$, . . . , $\mathbf{16}_n$ and exit $\mathbf{18}_1$, $\mathbf{18}_2$, . . . , $\mathbf{18}_n$ inverter/bypasses. In some embodiments, marking engines are removable. For example, in FIG. 1, an integrated marking engine and entry and exit inverter/bypasses of the processing unit $\mathbf{8}_4$ are shown as removed, leaving only a forward or upper paper path 20. In this manner, for example, the functional marking engine portion can be removed for repair, or can be replaced to effectuate an upgrade or modification of the printing system 6. While three marking engines A, B, C are illustrated (with the fourth marking engine being removed), the number of marking engines can be one, two, three, four, five, or more. Providing at least two marking engines typically provides enhanced features and capabilities for the printing system 6 since marking tasks can be distributed amongst the at least two marking engines. Some or all of the marking engines A, B, C may be identical to provide redundancy or improved productivity through parallel printing. Alternatively or additionally, some or all of the marking engines A, B, C may be different to provide different capabilities. For example, the marking engines B, C may be color marking engines, while the marking engine A may be a black only (K) marking engine. As described in detail below, a sequence selecting mechanism or device or algorithm 22 automatically selects one of the sequencing options based on the analysis of image page content and layout for job. An analyzing algorithm or processor or mechanism 24 analyzes, for example, the selected areas or regions of images within a print job to determine if there is repeating content sufficient to detect either large repeating areas of banner or background color and/or crossover image content. In one embodiment, the analysis is performed on a reduced resolution image, such as produced by common Digital Front End (DFE) software in the normal course of operation. For each print surface or image, the regions along the edges, for example, the left 10% and right 10%, are examined and stored. To determine whether a pair of adjacent pages should be printed in a first or cross-over ABBA sequence in which the facing pages of the booklet are printed on the same engine or a second or flip-deck ABAB sequence, in which all front surfaces are printed on the same engine, the binding region of the back surface of the current page is compared with the binding region of the front surface of the subsequent adjacent page and the non-binding regions of the front surface of the two pages are compared.

In comparing the two regions, portions of the regions that are white paper are not considered. Other portions are considered to match if the colors at corresponding locations match. For example, if a specified or requested color is found within the region of comparison, the degree of match is given as the area of contiguous matching colors divided by the area of non-white color within the region of comparison. Based on the analysis, the sequence selecting device 22 automatically selects one of the job sequences, such as described below, which is estimated to provide the best customer acceptability. For example, after both configurations' regions are compared, the configuration with the higher match, if it exceeds some predetermined threshold, is used to determine the print sequence. If the threshold is not exceeded, any print sequence may be used. Of course, customers can override or turn off the automatic sequence selecting algorithm 22 if desired via a selecting device 26 such as an illustrated switch, software option, a menu item, a touch button on an operator interface 28, and the like.

With continuing reference to FIG. 1, the illustrated marking engines A, B, C employ xerographic printing technology, in which an electrostatic image is formed and coated with a toner material, and then transferred and fused to paper or another print medium by application of heat and pressure. However, marking engines employing other printing technologies can be provided, such as marking engines employing ink jet transfer, thermal impact printing, or so forth. The processing units of the printing system 6 can also be other than marking engines; such as, for example, a print media feeding source or feeder 30 which includes associated print media conveying components 32. The media feeding source 30 supplies paper or other print media for printing. Another example of the processing unit is a finisher 34 which includes associated print media conveying components 36. The finisher 34 provides finishing capabilities such as collation, stapling, folding, stacking, hole-punching, binding, postage stamping, and so forth.

The print media feeding source 30 includes print media sources or input trays 40, 42, 44, 46 connected with the print media conveying components 32 to provide selected types of print media. While four print media sources are illustrated, the number of print media sources can be one, two, three, four, five, or more. Moreover, while the illustrated print media sources 40, 42, 44, 46 are embodied as components of the dedicated print media feeding source 30, in other embodiments one or more of the marking engine processing units may include its own dedicated print media source instead of or in addition to those of the print media feeding source 30. Each of the print media sources 40, 42, 44, 46 can store sheets of the same type of print media, or can store different types of print media. For example, the print media sources 42, 44 may store the same type of large-size paper sheets, print media source 40 may store company letterhead paper, and the print media source 46 may store letter-size paper. The print media can be substantially any type of media upon which one or more of the marking engines A, B, C can print, such as high quality bond paper, lower quality "copy" paper, overhead transparency sheets, high gloss paper, and so forth.

Since multiple jobs arrive at the finisher 34 during a common time interval, the finisher 34 includes two or more print media finishing destinations or stackers 50, 52, 54 for collecting sequential pages of each print job that is being contemporaneously printed by the printing system 6. Generally, the number of the print jobs that the printing system 6 can contemporaneously process is limited to the number of available stackers. While three finishing destinations are illustrated, the printing system 6 may include two, three, four, or more print media finishing destinations. The finisher 34 deposits each sheet after processing in one of the print media finishing destinations 50, 52, 54, which may be trays, pans, stackers and so forth. While only one finishing processing unit is illustrated, it is contemplated that two, three, four or more finishing processing units can be employed in the printing system 6.

Bypass routes in each marking engine processing unit provide a means by which the sheets can pass through the corresponding marking engine processing unit without interacting with the marking engine. Branch paths are also provided to take the sheet into the associated marking engine and to deliver the sheet back to the upper or forward paper path 20 or a reverse media path 60 of the associated marking engine processing unit.

The printing system 6 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets.

Print jobs can be supplied to the printing system 6 in various ways. A built-in optical scanner 70 can be used to scan a document such as book pages, a stack of printed pages, or so forth, to create a digital image of the scanned document that is reproduced by printing operations performed by the printing system 6. Alternatively, one or more print jobs 72 can be electronically delivered to a system controller 74 of the printing system 6 via a wired connection 76 from a digital network 80 that interconnects example computers 82, 84 or other digital devices. For example, a network user operating word processing software running on the computer 84 may select to print the word processing document on the printing system 6, thus generating the print job 72, or an external scanner (not shown) connected to the network 80 may provide the print job in electronic form. While a wired network connection 76 is illustrated, a wireless network connection or other wireless communication pathway may be used instead or additionally to connect the printing system 6 with the digital network 80. The digital network 80 can be a local area network such as a wired Ethernet, a wireless local area network (WLAN), the Internet, some combination thereof, or so forth. Moreover, it is contemplated to deliver print jobs to the printing system 6 in other ways, such as by using an optical disk reader (not illustrated) built into the printing system 6, or using a dedicated computer connected only to the printing system 6.

The printing system 6 is an illustrative example. In general, any number of print media sources, media handlers, marking engines, collators, finishers or other processing units can be connected together by a suitable print media conveyor configuration. While the printing system 6 illustrates a 2×2 configuration of four marking engines, buttressed by the print media feeding source on one end and by the finisher on the other end, other physical layouts can be used, such as an entirely horizontal arrangement, stacking of processing units three or more units high, or so forth. Moreover, while in the printing system 6 the processing units have removable functional portions, in some other embodiments some or all processing units may have non-removable functional portions. It is contemplated that even if the marking engine portion of the marking engine processing unit is non-removable, associated upper or forward paper paths 20 through each marking engine processing unit enables the marking engines to be taken "off-line" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some embodiments the printing system may be a stand alone printer or a cluster of networked or otherwise logically interconnected printers, with each printer having its own associated print media source and finishing components including a plurality of final media destinations.

Although several media path elements are illustrated, other path elements are contemplated which might include, for example, inverters, reverters, interposers, and the like, as known in the art to direct the print media between the feeders, printing or marking engines and/or finishers.

The controller 74 controls the production of printed sheets, the transportation over the media path, and the collation and assembly as job output by the finisher.

Figure 2:
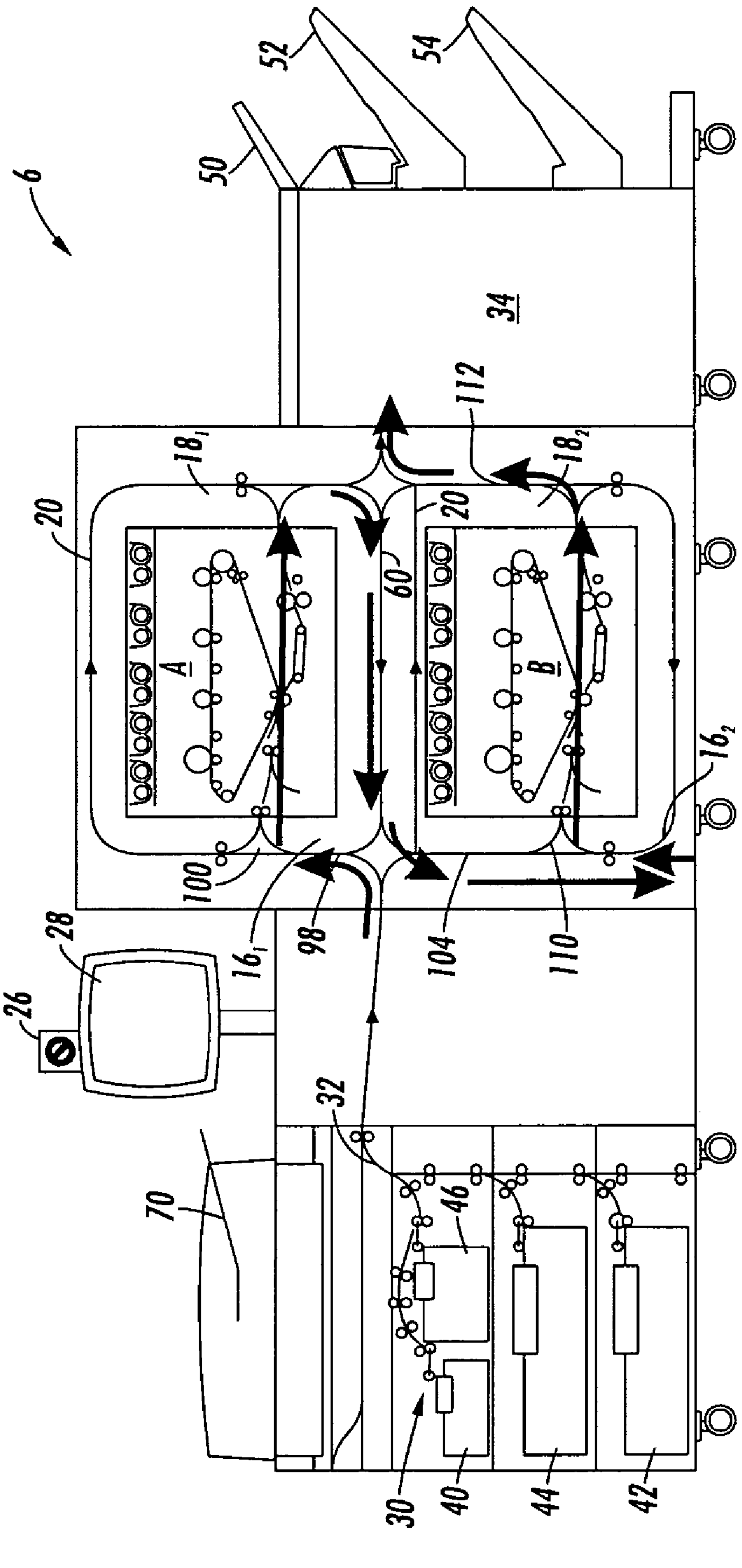
FIG. 2 diagrammatically illustrates a portion of the document processing system in which sheets are scheduled for printing in a sequence.

With reference to FIG. 2, in this embodiment, an implementation of the flip-deck ABAB sequencing option is illustrated. For the simplicity of illustration only two marking engines A, B are shown. In the flip-deck ABAB sequencing option, side 1 of all duplexed or two-sided sheets is printed by the first engine A and side 2 of all duplexed sheets is printed by the second engine B. To accomplish the ABAB sequence, each sheet is diverted via a first engine inbound media path 98 to an entrance 100 of the first engine A where side 1 is printed. Then, each sheet is transported via the reverse media path 60 and a second engine inbound media path 104 to a second engine entry inverter $\mathbf{16_2}$ prior to an entrance 110 of the second engine B. After inversion, each sheet is sent to the entrance 110 of the second engine B to print the side 2 image for that sheet. After the sides 1 and 2 of the sheet are printed, the sheet is delivered via a second engine outbound media path 112 to the output or finishing station 34. The flip-deck sequencing is advantageous, for example, where large color objects are printed on to the non-binding areas, close to the edges of the sheet.

Figure 3:
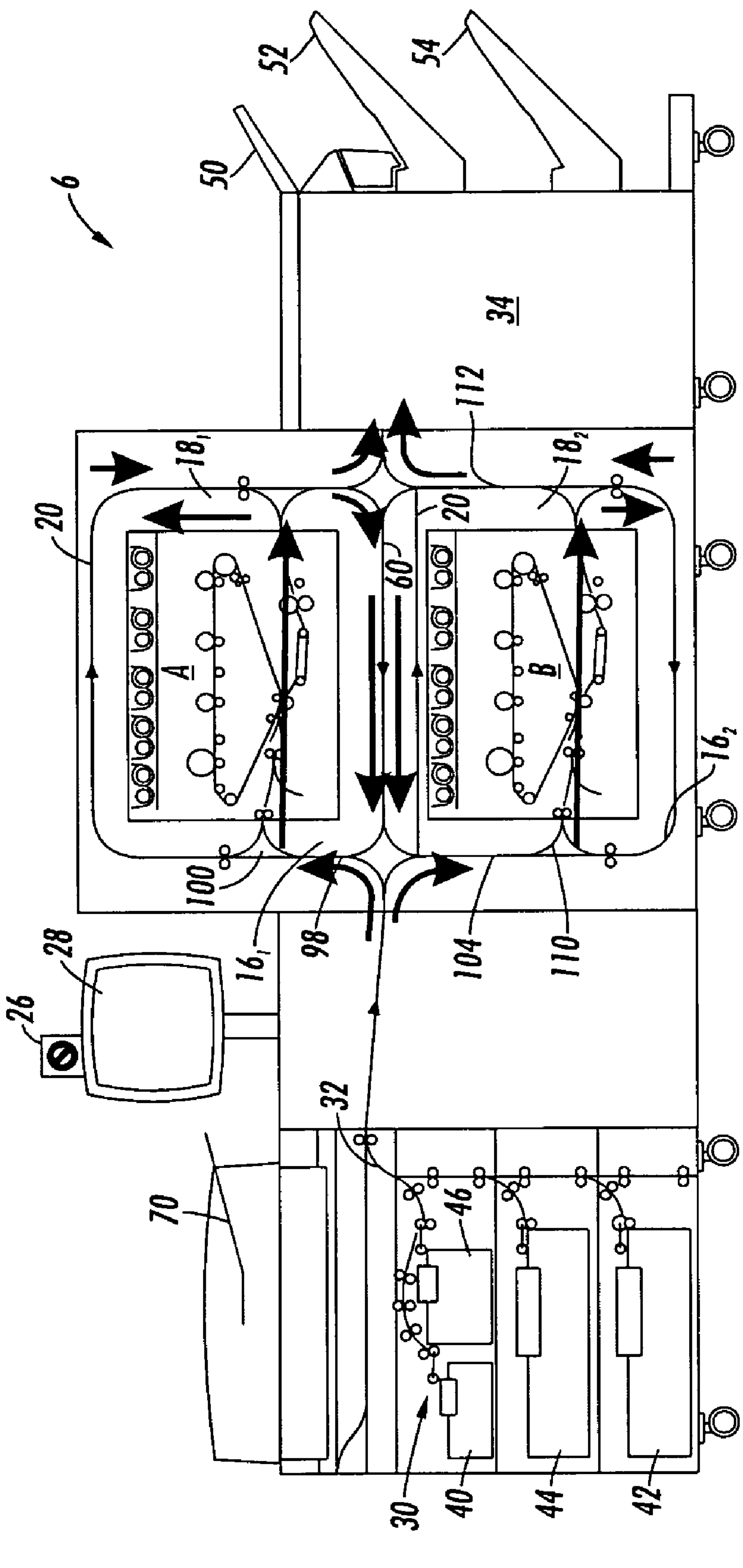
FIG. 3 diagrammatically illustrates a portion of the document processing system in which sheets are scheduled for printing in another sequence.

With reference to FIG. 3, in this embodiment, an implementation of the AABB sequencing option is illustrated. In the AABB sequencing option, sides 1 and 2 of odd numbered duplexed sheets are printed on the first engine A. Sides 1 and 2 of even numbered duplexed sheets are printed on the engine B. To accomplish this sequence, each odd page is first diverted via the engine inbound media path 98 to the entrance 100 of the engine A where side 1 is printed. Then, each odd sheet is transported via the reverse media path 60 to the first engine entry inverter $\mathbf{16_1}$, prior to re-entrance to the first engine A. Each odd sheet after inversion is sent through the first engine A to receive the side 2 image for that sheet. Each odd sheet is delivered via the first engine exit inverter/by-pass 18, to the output or finishing station 34. Each even sheet is diverted via the second engine inbound media path 104 to the entrance 110 of the second engine B where side 1 is printed. Then, each even sheet is transported via the reverse media path 60 to the second engine entry inverter $\mathbf{16_2}$, prior to re-entrance to the second engine B. Each even sheet after inversion is sent through the second engine entrance 110 to the second engine B to receive the side 2 image for that sheet. Each even sheet is delivered via the second engine exit inverter/by-pass $\mathbf{18_2}$ to the output or finishing station 34.

Figure 4:
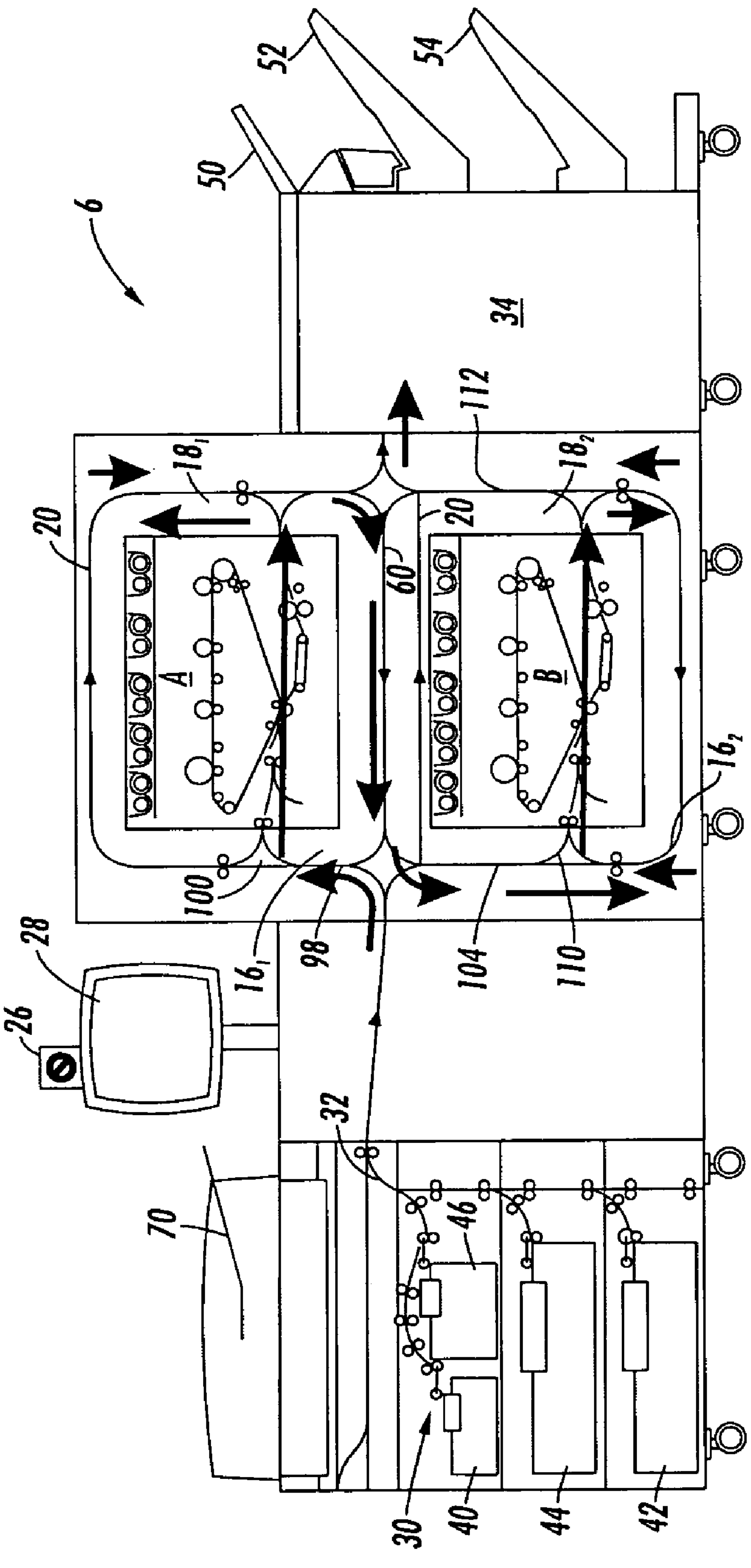
FIG. 4 diagrammatically illustrates a portion of the document processing system in which the sheets are scheduled for printing in another sequence.

With reference to FIG. 4, in this embodiment, an implementation of the cross-over ABBA sequencing option is illustrated. In the cross-over ABBA sequencing option, side 1 of the odd numbered duplexed sheets is printed on the first engine A. Side 2 of odd numbered duplexed sheets is printed on the second engine B. Conversely, side 1 of the even numbered duplexed sheets is printed on the second engine B. Side 2 of even numbered duplexed sheets is printed on the first engine A. More specifically, each odd page is diverted via the first engine inbound media path 98 to the first engine A where side 1 is printed. Each odd sheet then follows the reverse media path 60 and the second engine inbound media path 104 to the second engine entry inverter $\mathbf{16_2}$, prior to the second engine entrance 110. Each odd sheet after inversion is sent through the second engine B to receive the side 2 image, then delivered via the second engine outbound media path 112 to the output or finishing station 34. Each even sheet is diverted via the first engine inbound media path 98 to the first engine A where the side 2 image is printed first. Each even sheet then follows the reverse media path 60 and the second engine inbound media path 104 to the second engine entry inverter $\mathbf{16_2}$, prior to the second engine entrance 110. Each even sheet after inversion is sent through the second engine B to receive the side 1 image. For even sheets, the second engine exit inverter/by-pass $\mathbf{18_2}$ performs an additional inversion after side 1 of the even sheet is printed to put sheets in the proper finished sequence prior to exiting via the second engine outbound media path 112 to the output or finishing station 34.

Of course, it is contemplated that a user can select from one of the sequencing options described above for the entire job. Alternatively, a user can select different sequencing options for portions of a job where the varying sequencing can provide a benefit. One example would be for a centerfold signature or crossover, where those pages could be printed in the cross-over ABBA sequence, and the rest of the job could be printed in the flip-deck ABAB sequence.

With reference to FIG. 5 and reference again to FIG. 1, in a series 200 of pages, each page 202 includes a front and a back surface which are received in a sequence of first, second, third and fourth surfaces 210, 212, 214, 216. The image data of four sequential surfaces 210, 212, 214, 216 is received 230. A document portion or portions selecting mechanism or device or algorithm 232 selects 234 a portion or portions of the surfaces 210, 212, 214, 216 to be analyzed. For example, the document portion selecting device 232 selects outer and inner margins or first and second regions or portions 240, 242 of each surface, e.g. outer 10% of the image disposed about an edge 244 of each page and inner 10% of the image disposed about a binding point 246, which are analyzed by the analyzing algorithm 24. More specifically, a first array 250 ("ABBA") and a second array 252 ("ABAB"), of size equal to the selected margin, are initialized 254 to 0. Of course, it is contemplated that more than four surfaces can be selected to be analyzed, for example, six, eight, and the like. Likewise, more than two page sequencing options can be implemented, for example, three, four, five, six, etc.

Figure 5:
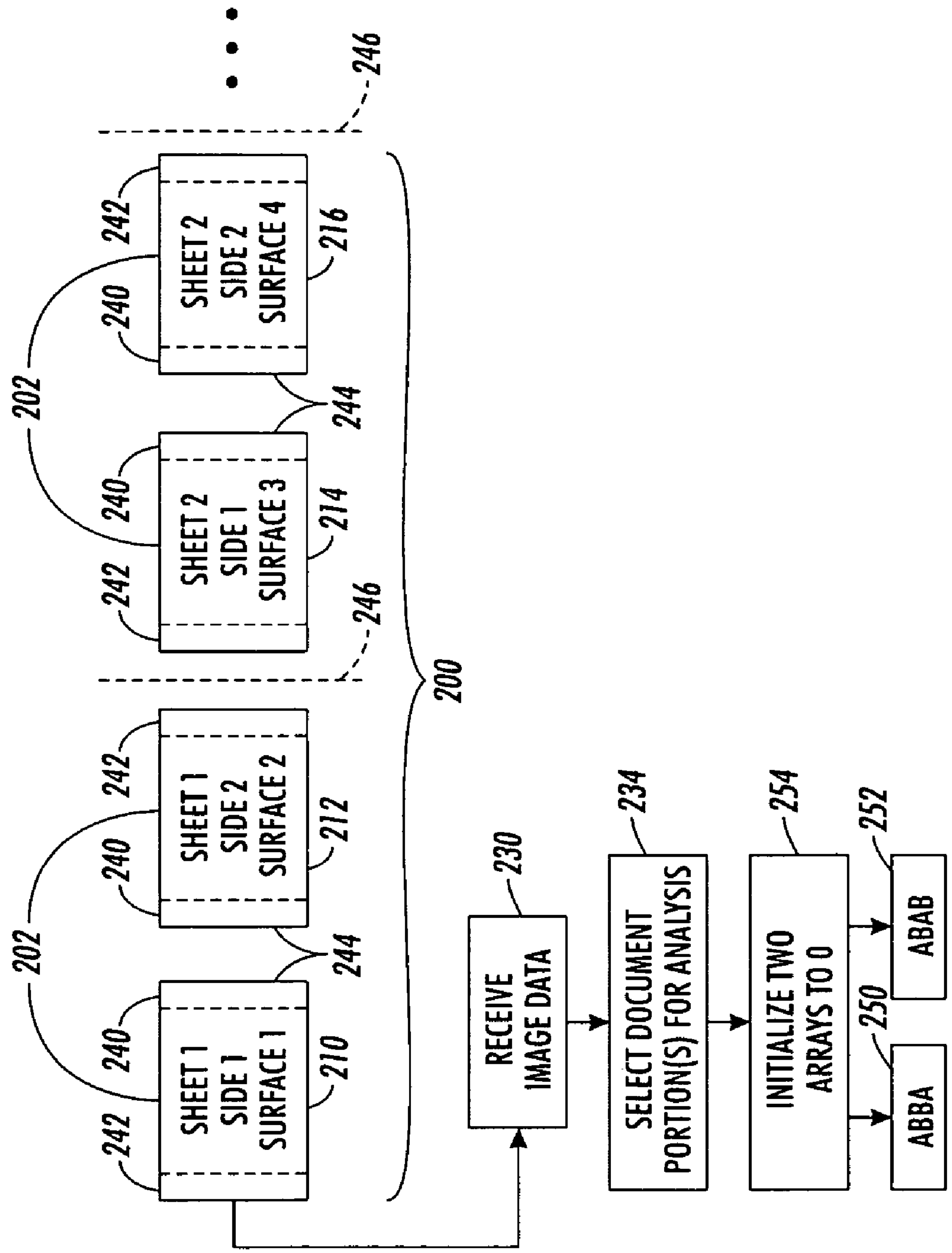
FIG. 5 is a flow chart of a detailed portion of a sequence selecting methodology.
Figure 6:
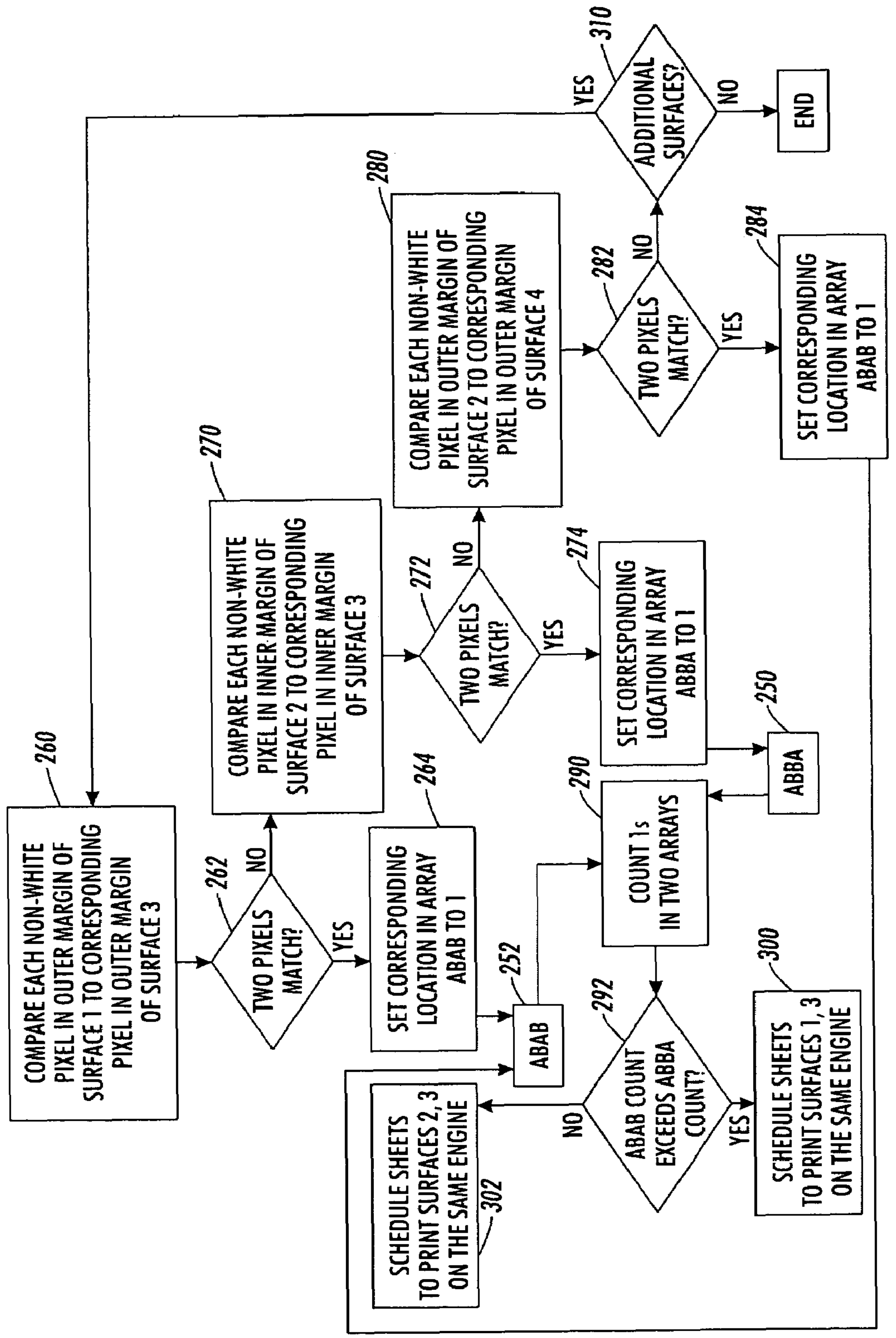
FIG. 6 is a flow chart of another detailed portion of a sequence selecting methodology.

With continuing reference to FIG. 5 and further reference to FIG. 6, each non-white pixel in the outer margin 240 of the first surface 210 is compared 260 to a corresponding pixel of the same position in the outer margin 240 of the third surface 214. If the compared pixels match 262 within a predetermined tolerance, the corresponding location in the second array 252 ("ABAB") is set 264 to 1. When comparing the two front surfaces or the two back surfaces, corresponding locations are locations with the same (x, y) coordinates in the raster.

Each non-white pixel in the inner margin 242 of the second surface 212 is compared 270 to a corresponding pixel in the inner margin 242 of the third surface 214. When comparing front and back surfaces (facing pages), corresponding pixels of the inner margins are the ones with the same vertical location and the mirrored horizontal locations across the gutter or the binding point 246. If the compared pixels match 272 within the predetermined tolerance, the corresponding location in the first array 250 ("ABBA") is set 274 to 1.

Each non-white pixel in the outer margin 240 of the second surface 212 is compared 280 to a corresponding pixel of the same position in the outer margin 240 of the fourth surface 216. If the compared pixels match 282 within a predetermined tolerance, the corresponding location in the second array 252 ("ABAB") is set 284 to 1.

Optionally, an erosion filter is applied to the first and second arrays 250 and 252 to eliminate all 1s that are isolated or in small groups. Of course, it is contemplated that other mechanisms which suppress small matching regions are used, such as, for example, a low-pass filter, subsampling, and not shrinking blocks. The 1s in the first and second arrays 250 and 252 are counted 290. If the count of 1s in the second array 252 ("ABAB") exceeds 292 the count of 1s in the first array 250 ("ABBA"), the front surfaces 210, 214 of two sequential sheets are scheduled 300 for printing on one of the first and second engine A, B. The back surfaces 212, 214 of the two sequential sheets are scheduled for printing on one of the first and second engine. Otherwise, the back surface 212 of the current sheet and the front surface 214 of the subsequent adjacent sheet (facing pages) are scheduled 302 to be printed on one of the first and second engine A, B. Optionally, if the count of 1s in the array having more is less than a specified threshold, the scheduling could be performed in another fashion, e.g. based on cost or speed, not on image quality considerations.

If additional surfaces are present 310, the analyzing algorithm 24 replaces the first surface with the third surface and the second surface with the fourth surface for analysis. The front and back surfaces of the new incoming sheet replace the third and fourth surfaces respectively. The analysis continues until no more sheets from the current job are received.

In an alternative embodiment, segmentation is applied to the input images before the images are compared or analyzed. The segmentation finds those portions of the images that are graphic elements and only portions of the input images that are graphic elements are compared as described above. The comparison could be pixel-wise, or, if the segmentation yields higher-level objects with size and position information, the objects could be compared.

In another alternative embodiment, the segmentation finds those portions of the images that are pictorial elements and only portions of the input images that are pictorial elements are compared. The nearby pictorials having similar colors are printed on the same engine for optimal consistency.

In yet another alternative embodiment, the segmentation finds those portions of the images that are pictorial elements and (separately) those that are graphical elements. Only those two portions are compared (omitting text). The thresholds used may be different for those two portions of images.

In yet another alternative embodiment, applicable as a variant on any of the above, the matches are weighted by the respective distance from the edge of the page or from the binding point.

Figure 7:
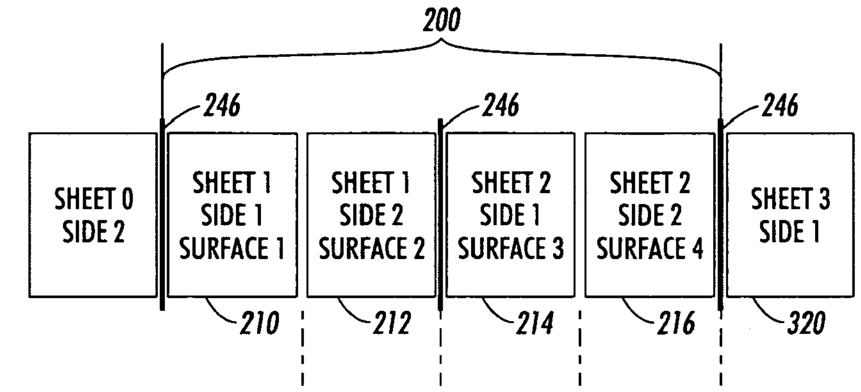
FIG. 7 is an illustration of a series of pages which includes four surfaces.
Figure 8:
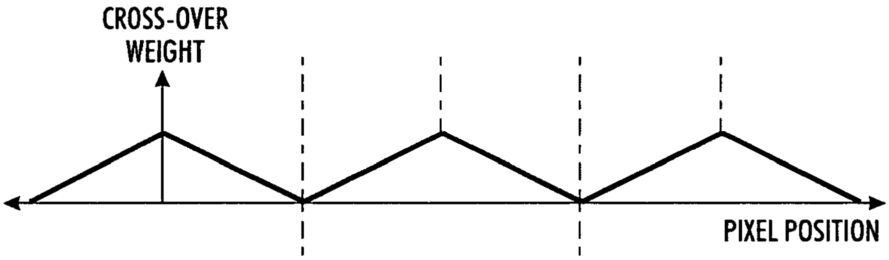
FIG. 8 is a graph representing a weight given to the matching pixels in determining a cross-over sequencing option versus a pixel location.

With reference to FIGS. 7 and 8, the series 200 of pages including four sides or surfaces is analyzed. To assess the cross-over color consistency requirement, e.g. the ABBA sequencing in which the facing sides or surfaces of the document are printed on the same engine, features such as colors, size and the like of the consecutive pair of surfaces are analyzed as described above. E.g., the back surface 212 of sheet 1 is compared to the front surface 214 of sheet 2, the back surface 216 of sheet 2 is compared to side 1 or front surface 320 of sheet 3. A weighting mechanism or algorithm or device 322 assigns weights to each determined matching pixel based, for example, on the pixel position, e.g. pixel's distance from the binding point 246. As illustrated in FIG. 8, the closer the pixel's position to the binding point 246, the greater the weight which is given to the matching pixel.

Figure 9:
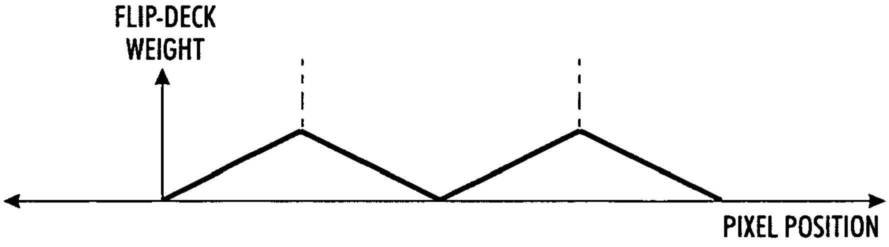
FIG. 9 is a graph representing a weight given to the matching pixels in determining a flip-deck sequencing option versus a pixel location.

With continuing reference to FIG. 7 and further reference to FIG. 9, to assess the flip-deck color consistency requirement, e.g. the ABAB sequencing in which the front sides or surfaces of the document are printed on the same engine and the back sides or surfaces of the document are printed on the same engine, features such as colors, size and the like of the consecutive pair of surfaces are analyzed as described above. E.g., the front surface 210 of sheet 1 is compared to the front surface 214 of sheet 2, the back surface 212 of sheet 1 is compared to the back surface 216 of sheet 2. The weighting mechanism 322 assigns weights to each determined matching pixel based, for example, on the pixel position, e.g. pixel's distance from the binding point 246. As illustrated in FIG. 9, the further the pixel's position from the binding point 246, the greater the weight which is given to the matching pixel.

Of course, other factors are given consideration when assigning weights to the pixels. For example, the closer is the color match of the pixels, the greater weight is given, the matching pixels of larger contiguous regions are given the greater weight, and other like factors. That is, the closer the color, the distance from the binding point or the margin, and the larger the size of the objects of the analyzed pair of surfaces, the higher is the requirement for color consistency. In one embodiment, the sum of the weighted similarities is used as the criterion to choose page sequencing option.

While other methods of comparison (e.g. within the DFE) might be employed, comparing raster information produced by the DFE has the advantage of being independent of DFE.

In this manner, the advantage is taken of the flexibility in the page scheduling and known differences in customer sensitivity to color variation based on the image page content for duplexed, multi-page jobs. A customer selectable and/or automated page sequencing option is provided for products with a color which allows side 1 and side 2 sheet sequencing to be optimized for the type of the page content being printed to maximize job acceptability.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of page scheduling for printing where corresponding portions of each of an adjacent pair of a front and back images are mirrored relative to a binding point, and corresponding portions of each two front images and each two back images of the sequential sheets have the same location on the image, the method comprising the steps of:

receiving at least sequential current and subsequent sheets of a print job, each sheet including a front image and a back image; and scheduling received sheets to be printed with at least one of a first and a second sequence by at least one of a first and a second marking engine, which step of scheduling includes:

selecting at least a first portion and a second portion of each front and back image, comparing corresponding selected portions of the front and back images, scheduling the front and back images for printing with one of the first and second sequence based on the comparison;

counting substantially similar pixels;

comparing corresponding pixels of the first selected portions of each pair of front images of the received sequential sheets;

identifying substantially similar pixels in the compared first portions of the front images;

comparing corresponding pixels of the first selected portions of each pair of back images of the received sequential sheets;

identifying substantially similar pixels in the compared first portions of the back images;

for each adjacent pair of back and front images, comparing each pixel of the second selected portion of the back image with each corresponding pixel of the second selected portion of the front image;

identifying substantially similar pixels in the compared second portions of the adjacent back and front images;

counting identified similar non-white pixels of the compared first portions of the front images and the compared first portions of the back images as a first count; and counting identified similar non-white pixels of the compared second portions of the adjacent back and front images as a second count.

2. The method as set forth in claim 1, wherein the first count is greater than the second count and further including:

scheduling the front images of the received sequential sheets to be printed by one of the first and second marking engine; and scheduling the back images of the received sequential sheets to be printed by one of the first and second marking engine.

3. The method as set forth in claim 2, further including:

printing the front image of the current sheet by the first marking engine;

transferring the current sheet to the second marking engine;

inverting the current sheet prior to a second engine entrance;

printing the back image of the current sheet by the second marking engine;

printing the front image of the subsequent sheet by the first marking engine;

transferring the subsequent sheet to the second marking engine;

inverting the subsequent sheet prior to the second engine entrance;

printing the back image of the subsequent sheet by the second marking engine; and assembling the sheets in a sequential order at a finishing station.

4. The method as set forth in claim 1, wherein the second count is greater than or equal to the first count and further including:

scheduling the front image of the current sheet and the back image of the subsequent sheet to be printed by one of the first and second marking engine; and scheduling the back image of the current sheet and the front image of the subsequent sheet to be printed by one of the first and second marking engine.

5. The method as set forth in claim 4, further including:

printing the front image of the current sheet by the first marking engine;

transferring the current sheet to the second marking engine;

inverting the current sheet prior to a second engine entrance;

printing the back image of the current sheet by the second marking engine;

printing the back image of the subsequent sheet by the first marking engine;

transferring the subsequent sheet to the second marking engine;

inverting the subsequent sheet prior to the second engine entrance;

printing the front image of the subsequent sheet by the second marking engine; and assembling the sheets in a sequential order at a finishing station.

6. The method as set forth in claim 1, wherein the first portions are disposed about an edge of each front and back image and the second portions of the adjacent front and back images are disposed about the binding point.

7. The method as set forth in claim 6, further including:

prior to the step of counting pixels into the first count, weighting the identified similar pixels based at least on a distance from the image edge to the identified similar pixel; and prior to the step of counting pixels into the second count, weighting the identified similar pixels based at least on a distance from the binding point to the identified similar pixel.

8. The method as set forth in claim 7, wherein the weighting is further based at least on one of:

a color match of the identified similar pixels;

a location match of the identified similar pixels;

a color index of the identified similar pixels; and a number of the identified similar pixels in a contiguous region.

9. The method as set forth in claim 1, wherein comparing corresponding selected portions of the front and back mages comprises comparing corresponding pixels of selected portions of the front and back images.

10. A printing system comprising:

at least first and second marking engines which each prints sequential sheets of a print job, each sheet including a front and a back image;

a document portion selecting mechanism which selects at least a portion of each front and back image;

an analyzing processor which analyzes corresponding selected portions and performs the steps of:

comparing corresponding pixels of first selected portions of each pair of front images of the sequential sheets;

determining substantially similar pixels of the first portions of the compared front images;

comparing corresponding pixels of first selected portions of each pair of back images of the sequential sheets;

determining substantially similar pixels of the first portions of the compared back images;

for each pair of back and front images which are adjacent one another, comparing each pixel of a second selected portion of the back image with each corresponding pixel of a second selected portion of the front image;

determining substantially similar pixels of the second portion of the compared adjacent back and front images;

counting determined similar non-white pixels of the compared first portions of the front images and the compared first portions of the back images as a first count; and counting determined similar non-white pixels of the compared second portions of the adjacent back and front images as a second count and wherein the sequence selecting mechanism is one of:

schedules the front images of the sequential sheets to be printed by one of the first and second marking engine, and the back images of the sequential sheets to be printed by one of the first and second marking engine, and schedules the adjacent front and back images of the sequential sheets to be printed by one of the first and second marking engine, and a sequence selecting mechanism which, based on the analysis, selects at least one of a first and a second sequence with which the front and back images of the sequential sheets are printed.

11. The system as set forth in claim 10, further including:

a filter, which compares a number of the determined similar pixels in each contiguous region with a predetermined threshold and, based on the comparison, eliminates from counting similar pixels in contiguous regions in which the number of the similar pixels is smaller than or equal to the predetermined threshold.

12. A method comprising:

receiving sequential sheets of a print job, each sheet including a front and a back image;

selecting at least a portion of each front and back image;

comparing corresponding pixels of the selected portions of the received sequential sheets;

identifying substantially similar pixels in the compared selected portions of the back and front images; and based on the identified similar pixels, scheduling the front and back images of the received sequential sheets to be printed with at least one of a first and a second sequence, wherein scheduling comprises the steps of:

selecting at least a first portion and a second portion of each front and back image, comparing corresponding pixels from the selected portions of the front and back images, scheduling the front and back images for printing with one of the first and second sequence based on the pixel comparison;

scheduling the front and back images for printing with one of the first and second sequence based on the pixel comparison;

comparing corresponding pixels of the first selected portions of each pair of front images of the received sequential sheets;

identifying substantially similar pixels in the compared first portions of the front images;

for each adjacent pair of back and front images, comparing each pixel of the second selected portion of the back image with each corresponding pixel of the second selected portion of the front image;

identifying substantially similar pixels in the compared second portions of the adjacent back and front images;

counting identified similar non-white pixels of the compared first portions of the front images and the compared first portions of the back images as a first count; and counting identified similar non-white pixels of the compared second portions of the adjacent back and front images as a second count.

* * * * *